United States Patent
Hofmann et al.

(10) Patent No.: US 11,566,929 B2
(45) Date of Patent: Jan. 31, 2023

(54) MEASURING DEVICE, IN PARTICULAR A FLOW METER, WITH AT LEAST ONE ULTRASONIC TRANSDUCER

(71) Applicant: DIEHL METERING GMBH, Ansbach (DE)

(72) Inventors: Alexander Hofmann, Sachsen (DE); Ulrich Gaugler, Weidenbach (DE); Marcus Wetzel, Heilsbronn (DE)

(73) Assignee: Diehl Metering GmbH, Ansbach (DE)

( * ) Notice: Subject to any disclaimer, the term of this patent is extended or adjusted under 35 U.S.C. 154(b) by 295 days.

(21) Appl. No.: 17/063,786

(22) Filed: Oct. 6, 2020

(65) Prior Publication Data
US 2021/0270651 A1 Sep. 2, 2021

(30) Foreign Application Priority Data

Feb. 28, 2020 (DE) .............................. 202020000805
Aug. 13, 2020 (DE) .............................. 202020003474

(51) Int. Cl.
*G01F 1/66* (2022.01)
*G01F 1/667* (2022.01)

(52) U.S. Cl.
CPC .................................. *G01F 1/667* (2013.01)

(58) Field of Classification Search
None
See application file for complete search history.

(56) References Cited

U.S. PATENT DOCUMENTS

| | | | | |
|---|---|---|---|---|
| 4,028,938 A * | 6/1977 | Eck | ......................... | G01F 1/667 73/861.31 |
| 4,185,498 A * | 1/1980 | Watson | ..................... | G01F 1/66 73/861.27 |
| 5,012,449 A * | 4/1991 | Todd | ....................... | G01F 1/667 73/861.18 |
| 5,639,971 A * | 6/1997 | Brown | ..................... | G01F 1/667 73/861.27 |
| 5,729,180 A * | 3/1998 | Brown | ...................... | H03L 7/00 331/65 |
| 2007/0008125 A1* | 1/2007 | Smith | ................. | B60R 25/1009 340/426.27 |
| 2019/0078919 A1* | 3/2019 | Niwa | ...................... | G01F 1/667 |

FOREIGN PATENT DOCUMENTS

DE 10118934 A1 10/2002

* cited by examiner

*Primary Examiner* — Harshad R Patel
(74) *Attorney, Agent, or Firm* — Laurence A. Greenberg; Werner H. Stemer; Ralph E. Locher

(57) ABSTRACT

A measuring device has at least one ultrasonic transducer and an evaluator for evaluating a measurement signal provided by the at least one ultrasonic transducer. The evaluator is set up to determine a first comparison signal, by comparing the measurement signal with a first switching threshold, and a second comparison signal, by comparing the measurement signal with a second switching threshold which is different from the first switching threshold, and to determine a signal amplitude of the measurement signal depending on the first and second comparison signal.

18 Claims, 3 Drawing Sheets

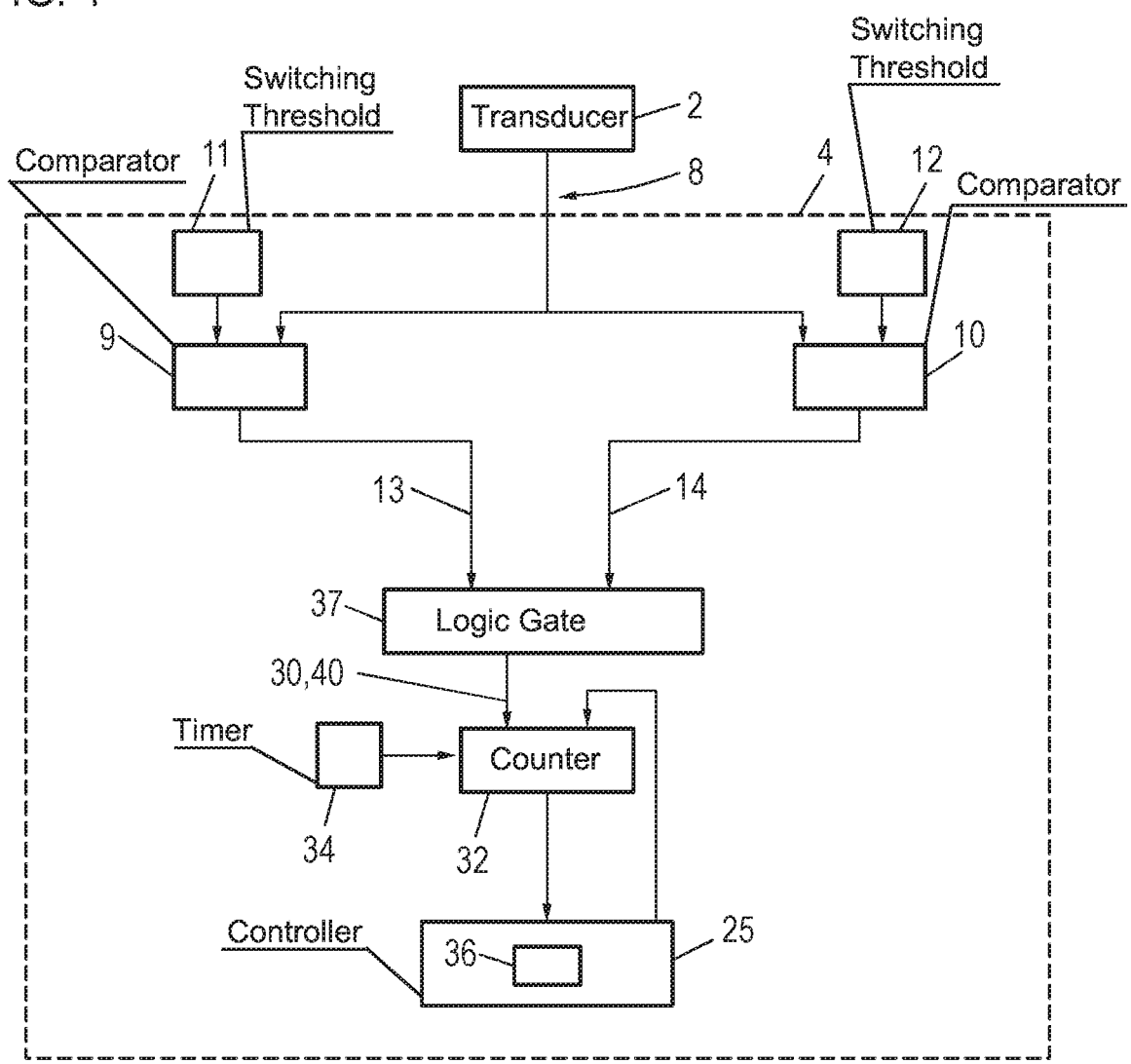

MEASURING DEVICE, IN PARTICULAR A FLOW METER, WITH AT LEAST ONE ULTRASONIC TRANSDUCER

CROSS-REFERENCE TO RELATED APPLICATION

This application claims the priority, under 35 U.S.C. § 119, of German applications DE 20 2020 000 805, filed Feb. 28, 2020, and DE 20 2020 003 474, filed Aug. 13, 2020; the prior application is herewith incorporated by reference in its entirety.

BACKGROUND OF THE INVENTION

Field of the Invention

The invention relates to a measuring device, in particular a flow meter, with at least one ultrasonic transducer and an evaluation device for evaluating a measurement signal provided by the ultrasonic transducer.

In the case of flow measurements with ultrasound, voltage amplitudes of between 50 mV and 3000 mV with frequencies which can be in the MHz range, for example, arise when received at the ultrasonic transducer, for example. In order to achieve a high signal-to-noise ratio, the highest possible voltage amplitudes are desired. Higher voltage amplitudes also reduce sensitivity to interferences, i.e. to interfering electromagnetic radiation, etc., for example.

On the one hand, low voltage amplitudes can be caused by contamination, for example by a deposition of lime, rust and magnetite. On the other hand, the voltage amplitudes which are reached depend on how close the measuring device is being operated to the resonance frequencies of the ultrasonic transducer being used or the overall system, for example. It is advantageous to monitor a signal amplitude, in order to enable an appropriate reaction to low signal amplitudes of the measurement signal, for example in order to draw attention to required maintenance of the measuring device or to identify recorded measurement data as potentially erroneous. In addition, monitoring the signal amplitude can be used to adapt a used excitation frequency of the ultrasonic transducer, for example in order to find a frequency with a maximum signal amplitude.

In particular ultrasonic meters which are used for flow measurement typically have a high time resolution for identifying specific occurrences, since this is required in any case for recording transit time differences in a precise manner. As far as it is even possible to record signal amplitudes directly, for example by means of analog to digital conversion of the signal, often only a relatively coarse resolution is achieved in this case, since high-frequency signal conversions are still relatively complex and corresponding measuring devices are often to be used in large quantities and thus are to be produced at a low cost.

Instead of directly recording an amplitude, published, non-prosecuted German patent application DE 101 18 934 A1 proposes supplying the measurement signal to a comparator, the switching threshold of which is not equal to zero, so that the outcome of this is an amplitude-dependent duty cycle of the square wave signal which is output by the comparator. The signal amplitude of the measurement signal can then be inferred from this duty cycle. In a number of applications, this method achieves sufficient levels of accuracy, however these measurements are relatively strongly influenced by flow noises, in particular at high flow rates or signal amplitudes, whereby a relatively large number of measurements are typically required in order to obtain a meaningful value for the signal amplitude of the measurement signal. Consequently, measuring is relatively time-consuming, which can be problematic in particular if an amplitude measurement is to be used for adjusting the oscillation frequency of the ultrasonic transducer. In addition, in operation situations in which sudden flow changes are to be expected, it cannot be assumed that a measurement can be repeated in a problem-free manner.

BRIEF SUMMARY OF THE INVENTION

The underlying object of the invention is therefore to specify a measuring device which makes it possible to determine the signal amplitude of the measurement signal with greater accuracy or with a reduced number of measurements, in particular even at high flow rates and signal amplitudes.

The object is achieved according to the invention by a measuring device of the aforementioned type, wherein the evaluation device is set up to determine a first comparison signal, by comparing the measurement signal with a first switching threshold, and a second comparison signal, by comparing the measurement signal with a second switching threshold which is different from the first switching threshold, and to determine a signal amplitude of the measurement signal depending on the first and second comparison signal.

Within the scope of the invention, it has been recognized that the accuracy of the determination of the signal amplitude can be significantly improved by using two different switching thresholds for providing two comparison signals compared to using only one comparator with only one switching threshold. Since a plurality of comparators can often be used anyway in particular in a flow meter, since they are already intended for improving the accuracy of transit time measurements, or the switching threshold of a used comparator can be adjusted, the intended use according to the invention of two switching thresholds can be implemented with minimal effort. In certain circumstances, it can also be sufficient to provide a software update for the evaluation device or to slightly modify an existing circuit, in order to adapt resistor networks, which are used for providing switching thresholds, or the like, in order to implement the measuring device according to the invention. The functionality of measuring devices can therefore be significantly improved in certain circumstances with minimal additional effort.

Hereinafter, a solution based on circuit technology shall primarily be discussed with regard to the evaluation device, in which solution a time discretization only takes place relatively late in the measuring chain. Alternatively, it would also be possible in principle to implement the evaluation device in a completely digital manner, for example by digitizing the entire measurement signal with a sufficiently high sampling rate and then further digitally processing it.

As will be explained later on in more detail, the measuring device is preferably a flow meter with a measuring tube and two ultrasonic transducers arranged spaced apart at the measuring tube, wherein a flow rate or a flow volume can be determined from the transit times between the ultrasonic transducers or a difference in transit time between the propagation directions, for example. For this purpose and also for other applications, it can be advantageous to also record the phase position of the measurement signal. In particular, the first and/or second comparison signal can be evaluated for this purpose, in order to determine a transit time. For example, a time counter can be used in order to determine the time from the beginning of a measurement window until an edge of the first or second comparison signal. If the switching thresholds are selected in a suitable manner, for example symmetrical with respect to a zero crossing of the measurement signal, or if firstly the signal amplitude is determined, the phase position of the measurement signal with respect to the sampling window and thus, if the position of the sampling window is known, the phase position of the measurement signal with respect to an emitted ultrasonic wave can be determined therefrom, from which a transit time can in turn be determined.

The first and/or the second comparison signal can be a square wave signal which only assumes its first value if the measurement signal falls below the respective switching threshold and a second value if the measurement signal exceeds the respective switching threshold. The comparison signal can thus essentially be a digital signal, wherein preferably no time discretization takes place when determining the respective comparison signal, as would be required when sampling the measurement signal with a specific sampling rate, for example. The first value can in particular correspond to a level of zero volts or a reference potential. The second value can correspond to a level which is common in digital technology, for example, in order to make it possible to use common logic gates and other components.

The evaluation device can comprise a first comparator with the first switching threshold which is set up to convert the measurement signal into the first comparison signal, and/or a second comparator with the second switching threshold which is set up to convert the measurement signal into the second comparison signal. The switching thresholds can in particular be predetermined by applying an offset voltage. Offset voltages can be fixedly predetermined, for example by a voltage divider which can be formed by corresponding resistors. Compared to the approach discussed at the beginning, it can be advantageous in the case of the measuring device according to the invention to use higher switching thresholds, for example of more than 50 mV, more than 100 mV or more than 200 mV. This can be achieved by exchanging resistors, which are used in the context of voltage division, or the like, for example.

Alternatively to using fixed switching thresholds or offset voltage, they can have a variable configuration, for example by being specified by a digital-to-analog converter. This makes it possible to adapt the switching threshold according to requirements, which is explained in more detail later on. The first and the second switching threshold can in principle be specified independently of one another, however it is also possible to specify an offset voltage for a switching threshold and to provide the other offset voltage by means of an inverter or the like. As will be explained further later on, a variable switching threshold can additionally or alternatively also be used to provide the first and second comparison signal successively by means of one single comparator.

The evaluation device can be set up to determine the signal amplitude depending on a time difference between a duration for which the first comparison signal assumes the first or the second value and a duration for which the second comparison signal takes the first or second value. In particular in cases in which the measurement signal results from the fact that a signal emitted by the ultrasonic transducer is reflected and received or a signal incoming from a further ultrasonic transducer is received, the measurement signal is typically approximately sinusoidal. In particular if the switching thresholds have different signs and in particular have the same values, those sections of the measurement signal in which the first comparison signal assumes the first value and the second comparison signal the second value or vice versa are thus the regions of the edges of the measurement signal. The time difference can thus be the time which the measurement signal requires to smear the edges between the switching thresholds. As will be further explained later on, this time is approximately inversely proportional to the signal amplitude.

The evaluation device can be set up to determine the duration for which the first comparison signal assumes the first or second value and/or the duration for which the second comparison signal assumes the first or second value, and/or the time difference for a sampling window which comprises a plurality of oscillation periods of the measurement signal. As a result, an average value of the time difference for the different edges of the measurement signal or the respective duration for different periods of the measurement signal can be taken into account, thus achieving a higher measuring accuracy. In the measuring device according to the invention, the measurement signal can in particular have a known frequency, for example if it has been previously emitted by the ultrasonic transducer itself or by a different ultrasonic transducer. The length of a sampling window being used can thus be directly selected using the frequency in such a way that a plurality of oscillation periods are present in the sampling window. Alternatively, it would be possible to count the number of rising or falling edges of one of the comparison signals, for example, in order to identify when a plurality of oscillation periods were recorded or the like.

The evaluation device can contain at least one time counter which is increased with a preset timing precisely when a time counter input signal with a predetermined value is supplied to the input of the time counter, wherein a respective time counter is supplied with the first and/or second comparison signal and/or a result signal, which is determined depending on the first and second comparison signal, or an output signal of a respective logic gate, which is supplied with the first and/or second comparison signal and/or the result signal as one of the logic gate input signals, as a counter input signal, wherein the respective duration or the time difference are specified by the counter value of the respective time counter. If the first and second comparison signal are determined successively for different time segments of the measurement signal or for time intervals which are different from one another, the comparison signals or the logic gate signals which are dependent on them can be supplied successively to the same time counter, in order to determine the first and second duration. For this purpose, the output of a comparator, which provides the first or second comparison signal depending on an adjusted switching threshold, can be connected to the input of the time counter directly or via the logic gate. By contrast, if the first and second comparison signal are provided at the same time, for example by two comparators, these signals or the signals derived therefrom can be provided as a respective time counter input signal to different time counters or can be linked to the result signal.

The predetermined value can in particular be the second value. A respective time counter can therefore record the duration for which the respective comparison signal takes the second value and thus the duration for which the measurement signal is above the first or second switching threshold. The result signal can in particular be the difference or an exclusive OR operation of the comparison signals. In this way, it can be achieved that the time counter is increased with a preset timing at precisely the time within which only one of the comparison signals has the second value, i.e. at those times within which the measurement signal is between the first and the second switching threshold. As explained above, edge times of sinusoidal waves are thus in particular recorded. The use of a second time counter can therefore possibly be dispensed with.

The use of the logic gate can in particular serve to only increase the time counter within a sampling window. The logic gate can be fed with a square wave signal as a further logic gate input signal, which square wave signal changes its value at the beginning and at the end of the or a sampling window, for which the signal amplitude and/or the duration for which the first comparison signal assumes the first or second value and/or the duration for which the second comparison signal assumes the first or second value is to be determined. In particular, the time counter can be read at the end of the sampling window, i.e. a falling edge of the square wave signal, and can either be reset immediately or at the beginning of the next sampling window.

The evaluation device can be set up to determine the result signal as a difference signal between the first and second comparison signal. Additionally or alternatively, the evaluation device can contain one or a further logic gate, in particular an exclusive OR gate, wherein the evaluation device is set up in such a way that the first and second comparison signal are supplied to the logic gate as input signals and that an output signal of the logic gate is used as a result signal. As explained above, determining the result signal in such a manner makes it possible to determine the time difference with one single time counter in certain circumstances.

The evaluation device can be set up to determine the signal amplitude by dividing a predetermined scaling factor by the time difference. This corresponds to a small angle approximation, under the assumption that the measurement signal is a sinusoidal oscillation. If, for example, switching thresholds are used which are symmetrical with respect to the zero crossing of a sinusoidal oscillation of this type, the following applies to the distance between the switching thresholds $\Delta V$:

$$\frac{\Delta V}{2} = A * \sin\left(2\pi * f * \frac{\Delta t}{2}\right) = A * \sin\left(2\pi * f * \frac{\Delta T}{2n}\right). \quad (1)$$

In this case, A is the desired signal amplitude, f the frequency of the sinusoidal oscillation, $\Delta t$ the time interval between exceeding the first switching threshold and exceeding the second switching threshold for one single edge of the oscillation, and $\Delta T$ the determined time difference within the sampling window. n specifies how many edges of this type are present in the sampling window and thus corresponds to twice the number of oscillation periods recorded. By using the small angle approximation for the sinusoidal function $$\sin(x) \approx x \quad (2)$$

the oscillation amplitude A can be specified as follows:

$$A = \frac{\Delta V * 2n}{4\pi * f \Delta T} = \frac{S}{\Delta T}. \quad (3)$$

In this case, S is the scaling factor already mentioned above. The above formulae are based on the time difference $\Delta T$ being specified in seconds. Time counters with high time resolution are often used for measuring with the help of ultrasonic signals, for example with a distance between the time counts of 250 ps. By correspondingly adapting the scaling factor S, a time difference which is specified as a counter reading of a counter of this type can also be used instead of the time difference $\Delta T$ which is specified in seconds. If, for example, the time counting rate mentioned above is used and a distance of the two switching thresholds of 60 mV and a frequency of the oscillation of 1 MHz is assumed, 229183 can be used as a scaling factor and this scaling factor can be divided by the counter reading which specifies the time difference. If a peak-to-peak voltage is to be determined instead of a signal amplitude, a scaling factor which is twice as high can simply be used which is divided by the time difference.

The frequency of the oscillation which is used in the above calculation can be known. This is typically the case if the measurement signal describes a reflection of an ultrasonic signal emitted by the ultrasonic transducer or a measurement signal received by a different ultrasonic transducer. Alternatively, the frequency can also be determined during operation, for example from the distances of the edges in the first or second comparison signal.

The evaluation device can comprise a respective D flip-flop, the clock input of which is fed with the or a square wave signal which changes its value at the beginning and at the end of the or a sampling window, for which the signal amplitude and/or the duration for which the first comparison signal assumes the first or second value and/or the duration for which the second comparison signal assumes the first or second value is to be determined, and to the data input of which the first or second comparison signal or the or a result signal which is determined from the first and second comparison signal is in each case supplied. The evaluation device is set up to break off the determination of the signal amplitude and/or the respective duration for the current sampling window or to discard the determined signal amplitude and/or the respective determined duration if the output of the D flip-flop has a predetermined value.

At the output, a D flip-flop always specifies the value which was present at the data input when a trigger signal was last received at the clock input. The D flip-flop therefore acts as a store for the state of the supplied comparison signal or result signal at the beginning of the sampling window. In particular, if the comparison signals are determined in a parallel manner, for example by two comparators, using the D flip-flop makes it possible to discard the measurements in sampling windows at the beginning of which the measurement signal is already between the first and the second switching threshold, since this can result in an error when determining the time difference.

By contrast, if only one comparator with a variable comparative value is used in order to successively provide both comparison signals, as will be explained in greater detail later on, separate sampling windows can be used for determining the two durations. The data input of the D flip-flop is then successively supplied with the first and second comparison signal, in particular by the output of the comparator, which provides the first or the second comparison signal depending on an adjusted comparator switching threshold, being connected to the data input. Determining the respective duration can then be broken off, for example, or the determined duration can be discarded if the output of the D flip-flop indicates that the measurement signal already exceeds the respectively used switching threshold at the beginning of the sampling window or the comparison signal already takes the value for which the duration is to be determined, since this can result in an erroneous determination of the duration.

The first and second switching threshold preferably have signs which are different from one another and in particular have the same value. For example, the measurement signal can be bipolar and switching thresholds of plus and minus 210 mV or plus and minus 30 mV can be used, for example.

As already explained above, the evaluation device can contain a first comparator with the first switching threshold which is set up to convert the measurement signal into the first comparison signal, and/or a second comparator with the second switching threshold which is set up to convert the measurement signal into the second comparison signal. The comparison signals can therefore be determined at the same time, whereby the determination of the signal amplitude can be particularly insensitive to flow changes or other interferences.

However, in order to implement the explained determination of the signal amplitude with particularly little technical effort, the comparison signals or the associated durations can also be determined successively, i.e. for different time segments of the measurement signal. The evaluation device can therefore be set up to determine the first comparison signal during a first time interval by comparing the measurement signal with the first switching threshold and to determine the second comparison signal after the end of the first time interval during a second time interval by comparing the measurement signal with the second switching threshold.

The evaluation device can in particular contain a comparator, wherein a control device of the measuring device, in particular a control and evaluation circuit, is set up to set a comparator switching threshold of the comparator to the first switching threshold in the first time interval and to the second switching threshold in the second time interval. If a comparator with a variable switching threshold which can be adjusted by predetermining an offset voltage, for example, by means of a digital-to-analog converter, for example, is thus used, one single comparator is sufficient for generating both comparison signals, whereby the implementation effort can be reduced, in particular since only one time counter or one D flip-flop can be used, for example. The control device can, for example, also process determined measurement data, for example determine or calculate the signal amplitude from the comparison signals or durations and thus form a control and evaluation circuit.

The measuring device can be set up to repeatedly determine the signal amplitude and, in the case of at least one of the repetitions, to specify the first and/or the second switching threshold depending on the signal amplitude determined previously. For this purpose, the measuring device can contain a respective digital-to-analog converter, in order to provide a respective comparator with an offset voltage which corresponds to the appropriate switching threshold, for example.

Specifying the switching thresholds depending on the signal amplitude is advantageous because switching thresholds which are too small compared to the signal amplitude can lead to unnecessarily significant errors due to noise. By contrast, if the switching thresholds are too large with respect to the amplitude, the small angle approximation explained previously can lead to significant errors. It can therefore be advantageous to firstly determine an erroneous signal amplitude by way of a first measurement, which can then be used to specify the switching threshold, which results in a less significant error when determining the signal amplitude again.

The measuring device can contain at least two of the ultrasonic transducers which are arranged spaced apart from one another at a measuring tube of the measuring device, through which measuring tube a fluid can flow. The evaluation device can be set up to control in each case one of the ultrasonic transducers for exciting an ultrasonic wave in the fluid, and to determine a transit time of the ultrasonic wave between the ultrasonic transducers using the measurement data of the other ultrasonic transducer, and to determine a flow rate and/or a flow volume of the fluid through the measuring tube depending on the transit time. The measuring device can therefore be a flow meter which in particular can evaluate transit time differences between different propagation directions, in order to determine a flow rate or a flow volume. An approach of this type is known in principle from the prior art and shall not be explained in detail.

One possibility for determining transit times of an ultrasonic wave between ultrasonic transducers is to determine the phase position of the received ultrasonic wave and thus the measurement signal with respect to a predetermined sampling window. In order to achieve this, a time counter can be started at the beginning of the sampling window and can be read in the case of value changes to the first or second comparison signal, for example. If a signal amplitude of the measurement signal is known, it can be sufficient to evaluate this time counter in the case of a value change to one of the comparison signals, in order to determine a phase position of the measurement signal with respect to the sampling window and thus a transit time. Alternatively, it is also possible to take both comparison signals into account, in particular if the switching thresholds are symmetrical to a zero crossing of the measurement signal, whereby the position of the zero crossing and thus the phase position can be inferred by means of the positions of the edges of the first and second comparison signal.

As set forth in the above explanations regarding the determination of the phase position, substantially identical components can be used for determining the transit time and for determining the signal amplitude, so that an additional determination of the signal amplitude is possible with little implementation effort.

Other features which are considered as characteristic for the invention are set forth in the appended claims.

Although the invention is illustrated and described herein as embodied in a measuring device, in particular a flow meter, with at least one ultrasonic transducer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

FIG. 4 is a block diagram of an evaluation device of a further exemplary embodiment of a measuring device according to the invention.

DETAILED DESCRIPTION OF THE INVENTION

Figure 1:
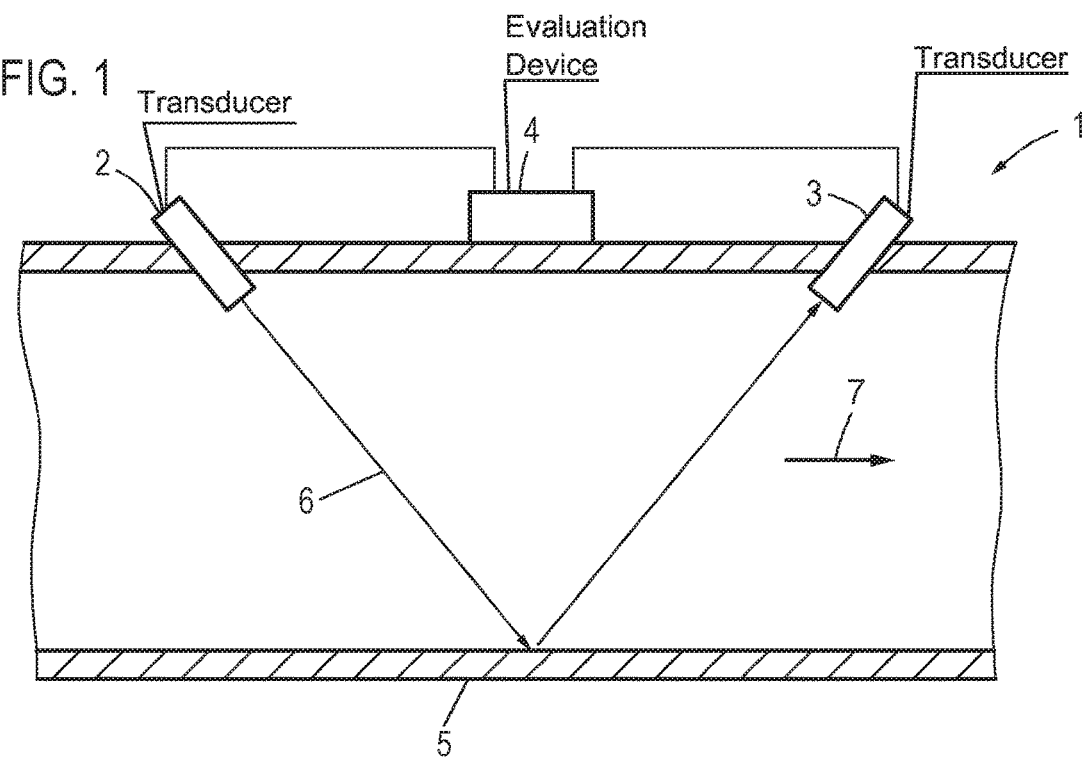
FIG. 1 is a diagrammatic, sectional view of an exemplary embodiment of a measuring device according to the invention.

Referring now to the figures of the drawings in detail and first, particularly to FIG. 1 thereof, there is shown a measuring device 1, in the example a flow meter, with two ultrasonic transducers 2, 3 and an evaluation device 4. The ultrasonic transducers 2, 3 are arranged at a measuring tube 5 through which a fluid can flow, as indicated schematically by arrow 7. An ultrasonic wave can be emitted by the ultrasonic transducer 2, as depicted schematically by arrow 6, with respect to which ultrasonic wave the ultrasonic transducer 3 then records measurement signals which are evaluated by the evaluation device 4. The fluid is also typically radiated in the opposite direction, i.e. from the ultrasonic transducer 3 to the ultrasonic transducer 2, for flow measurement. Transit times of the ultrasonic wave are determined for both propagation directions and a flow rate can be calculated by means of the transit time difference and thus also a flow volume for the fluid can be calculated if the tube diameter is known.

In the example shown, the ultrasonic waves are directly coupled into the fluid or received therefrom by way of the ultrasonic transducers 2, 3 and the radiation of the fluid takes place diagonally. This arrangement is purely exemplary. In principle, radiation into the fluid could also take place perpendicular to the direction of flow and the ultrasonic waves could be deflected by ultrasonic mirrors arranged in the fluid flow. In a further alternative configuration, the ultrasonic transducers 2, 3 could be arranged on the outside of the measuring tube 5 and initially excite oscillations, for example guided waves, in the tube wall of the measuring tube which, in turn, excite oscillations in the fluid.

A particularly energy-efficient operation of the measuring device is possible if the ultrasonic transducers 2, 3 are operated at least close to their resonance frequency. However, the resonance frequencies of the ultrasonic transducers 2, 3 could change as a result of deterioration, for example, so that it can sometimes be necessary for the evaluation device 4 to determine an optimal operating frequency for the ultrasonic transducers 2, 3. This can be achieved by varying the frequency and determining that frequency with a maximum signal amplitude of the measurement signal received by the respective ultrasonic transducer 2, 3. The signal amplitude of the measurement signal can also be relevant in order to identify a damping of the signal amplitude as a result of contamination of or even damage to the measuring device 1, for example. When a signal amplitude which is too low is identified, a user can be informed that maintenance is required, for example.

In order to implement the above functions, for example, the evaluation device 4 is set up to determine a signal amplitude of the respective measurement signal of the ultrasonic transducers 2, 3. One possible implementation for this is explained hereinafter with reference to FIG. 2 using the example of the ultrasonic transducer 2. In this case, the ultrasonic transducer 2 provides the measurement signal 8 to the evaluation device 4. An example for a measurement signal 8 of this type is depicted in FIG. 3 in the top diagram. In the evaluation device 4, the measurement signal 8 is supplied to a first comparator 9 with a first switching threshold 11 and to a second comparator 10 with a second switching threshold 12. The switching thresholds 11, 12 can therefore be specified as offset voltages for the comparators 9, 10. Voltages of this type can be provided by resistor networks or the like, for example. Alternatively, it would be possible to use a respective digital-to-analog converter to specify the switching thresholds 11, 12.

The comparison signals 13, 14, which are depicted in the middle or bottom diagram in FIG. 3, result at the output of the comparators 9, 10. The comparison signals 13, 14 are square wave signals which assume a first value 15 if the measurement signal 8 falls below the respective switching threshold 11, 12 and a second value 16 if the measurement signal 8 exceeds the respective switching threshold 11, 12. Within the context of further processing, a time difference 17 between the durations 18, 19 for which the first or second comparison signal 13, 14 takes the second value 16 is determined. If a difference 20 between the switching thresholds 11, 12 is known, the signal amplitude 22, 36 of the measurement signal 8 can be determined using the time difference 17. In this case, FIG. 3 depicts the time difference 17 for an individual edge of the measurement signal 8. If, as also depicted in FIG. 3, a plurality of periods of the measurement signal 8 are recorded within a sampling window 23, which is depicted as a rectangular function 24 in FIG. 3 which changes its value at the beginning and end of the sampling window 23, a total time difference which is not depicted is thus the multiple of the time difference 17 for the individual edge 21. If, as shown, three periods are recorded, the total time difference is six times the time difference 17 shown for the individual edge 21.

In order to avoid errors when determining the time difference 17, only sampling windows 23 should be taken into account at the beginning of which the measurement signal is not between the switching thresholds 11, 12. In order to check this condition, the evaluation device 4 contains two D flip-flops 38, 39, the clock input of which is supplied with the square wave signal 24 which describes the sampling window 23. At the beginning of the sampling window 23, the value is therefore held at a data input which is supplied with the first or second comparison signal 13, 14, and is provided at the output of the D flip-flop. If the outputs of the D flip-flop 38, 39 show that at the beginning of the sampling window 23 precisely one of the comparison signals 13, 14 has the first value 15, i.e. that the value of the measurement signal 8 is between the switching thresholds 11, 12 at this point in time, the determination of the signal amplitude 22, 36 can be broken off or the result can be discarded, since it is potentially erroneous, as explained above.

The rectangular function 24 which describes the sampling window 23 is additionally supplied to a respective logic gate 26, 27, in particular an AND gate, together with a respective one of the comparison signals 13,14 in order to ensure that only the part of the measurement signal 8 which is within the sampling window 23 is taken into account within the context of processing. The output signals 28, 29 provided by the logic gate 26, 27 are supplied as time counter input signals 30, 31 to an input of the respective time counter 32, 33 which is increased with a preset timing 34. The time counters 32, 33 can be reset by the edges of the square wave signal 24 which describes the sampling window 23 and can be read at the end of the sampling window 23, for example by the falling edges of the square wave signal 24. Counting the time counter 32, 33 only takes place if the respective time counter input signal 30, 31 has the second value 16. The product of the counter value and the reciprocal value of the timing 34 thus corresponds to the total duration, i.e. based on the three recorded periods, three times the shown duration 18, 19 for which the respective comparison signal 13, 14 has the second value 16 within the sampling window 23.

The control and evaluation circuit 25, which can be a microprocessor, for example, subtracts the counter values or durations 18, 19 from one another, in order to determine a time difference 17, 35, by means of which the signal amplitude 22, 36 is determined. The signal amplitude 22, 36 can be determined by dividing a predetermined scaling factor by the time difference 17, 35, for example.

FIG. 4 shows an alternative configuration of the evaluation device 4, which can be used instead of the configuration discussed previously. Processing the measurement signals 8 takes place in an identical manner over long distances, such that this part of the processing shall not be discussed further. Only the differences between the evaluation device 4 shown in FIG. 2 and the one in FIG. 4 shall be discussed hereinafter.

In the configuration shown in FIG. 4, the logic gates 26, 27 as well as the D flip-flops 38, 39 are, on the one hand, dispensed with. This reduces the circuit complexity but potentially requires a more complex processing in the control and evaluation circuit 25 or can sometimes lead to an erroneous determination of the signal amplitude.

A further essential difference is that in the evaluation device 4 shown in FIG. 4, only one single time counter 32 is used, by means of which the time difference 17 between the durations 18, 19 is directly calculated. This is made possible by the comparison signals 13, 14 being supplied to a logic gate 37, namely an exclusive OR gate, which results in a result signal 40 which only has the second value 16 when precisely one of the comparison signals 13, 14 has the first value 15, i.e. only at times at which the measurement signal 8 is between the first and second switching threshold 11, 12. Since the time counter 32 directly determines the time difference, the control and evaluation circuit 25 can use the counter value directly in order to divide a corresponding scaling factor and thus determine the signal amplitude 22, 36.

As already mentioned, it is possible that the switching thresholds 11, 12 can be variable, for example by them being specified by a digital-to-analog converter. This can take place by way of a control and evaluation circuit 25 depending on a previously determined signal amplitude 22, 36, for example, in order to avoid, on the one hand, a lowest possible noise and, on the other hand, a deterioration in the result through non-linearities or the like not taken into account within the context of data processing.

Figure 2:
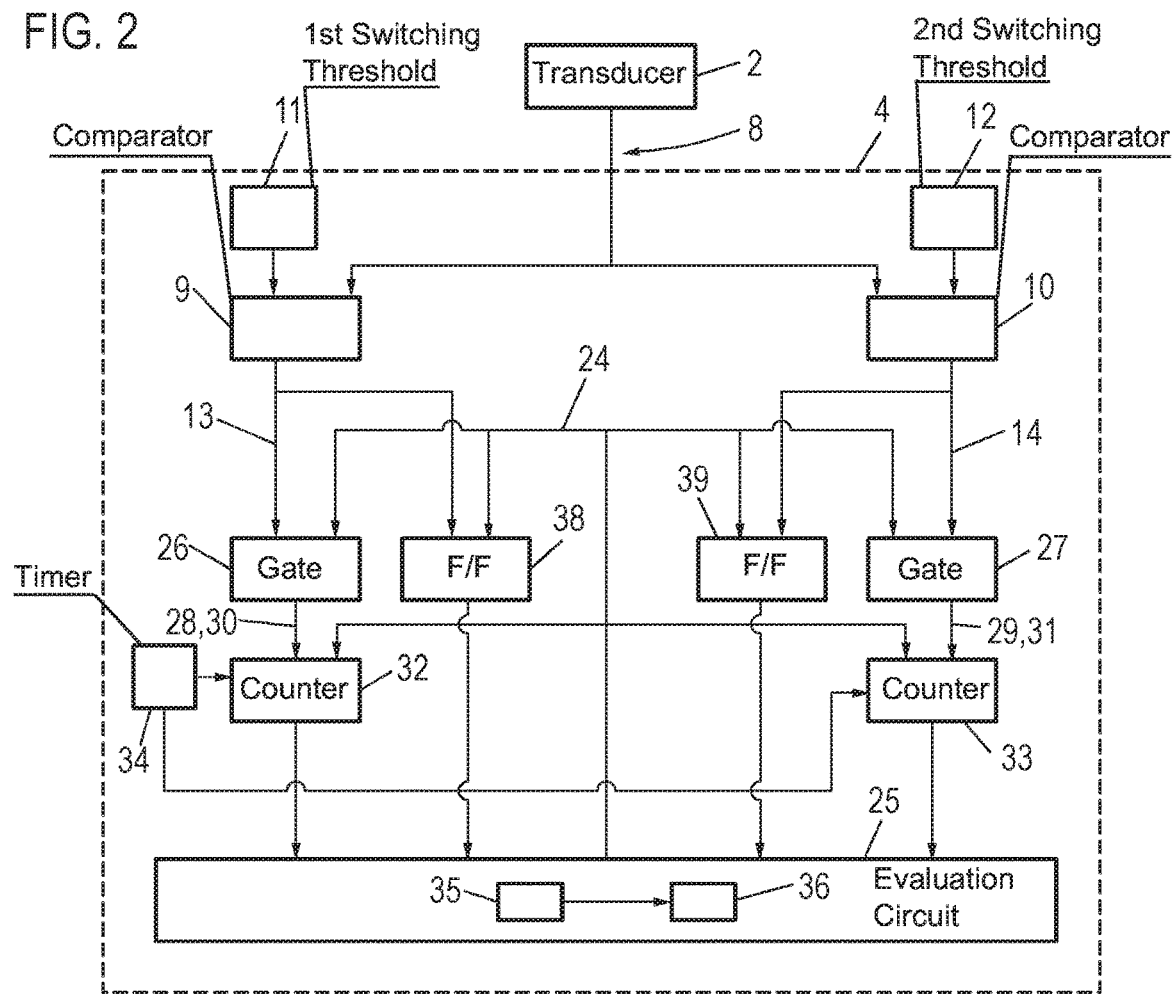
FIG. 2 is a block diagram showing components or processing steps used in the evaluation device of the measuring device shown in FIG. 1 for determining the signal amplitude from the measurement signal.
Figure 3:
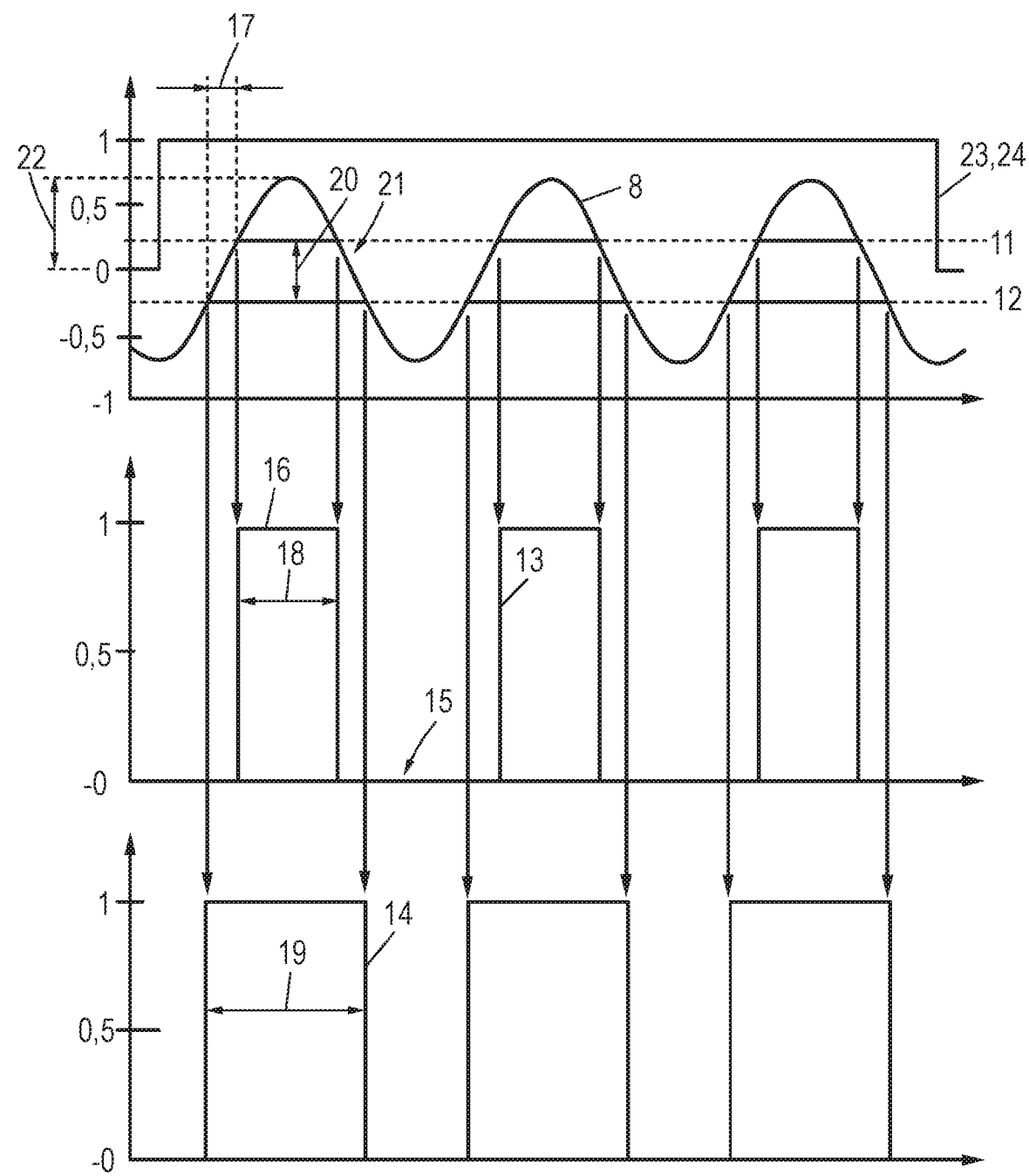
FIG. 3 are graphs of an exemplary measurement signal as well as a comparison signals which result therefrom.

The exemplary embodiments shown in FIGS. 2 and 4 use two comparators 9, 10, which makes it possible to simultaneously determine the first and second comparison signal 13, 14. Alternatively, the first and second comparison signal 13, 14 can also be determined during different time intervals, i.e. for different time segments of the measurement signal. This also makes it possible to make a robust determination of the signal amplitude, wherein the determination is possible with significantly reduced technical effort by only using one comparator 9, for example, for which different switching thresholds 11, 12 are specified in the different time intervals by way of a digital-to-analog converter of the control and evaluation circuit 25, for example, in order to determine the different comparison signals 13, 14.

As explained hereinafter with reference to FIG. 2, the effort required for processing the comparison signals 13, 14 can also be significantly reduced in this case. While the measurement signal 8 is supplied to two processing paths in the evaluation device 4 in FIG. 2, only one of these processing paths is required in a sequential determination of the processing signals. The comparator 10, the logic gate 27, the time counter 33 and the D flip-flop 39 can therefore be dispensed with.

The remaining components can essentially be operated as already explained in FIG. 2. However, it is advantageous to specify separate sampling windows 23 for the different time intervals and thus for determining the durations 18, 19 for which the first or second comparison signal 13, 14 assumes the second value 16 by way of the control and evaluation circuit 25. In this case, the output of the D flip-flop 28 indicates whether the comparison signal 13, 14 supplied in each case, i.e. the output signal of the comparator 9, was already at the second value 16 at the beginning of the sampling window. Since this can falsify the determination of the respective duration 18, 19, the determination of the duration 18, 19 should in this case be broken off for the current sampling window 23 or the determined duration 18, 19 should be discarded. A new sampling window can then be started in order to redetermine the corresponding duration 18, 19, or both durations 18, 19 can be redetermined in this case.

For determining the signal amplitude, the evaluation and control circuit 25 can firstly set the comparator switching threshold of the comparator 9 to the first switching threshold 11, in order to determine the duration 18 for which the resulting output signal of the comparator, i.e. the first comparison signal 13, has the first value 16 in a first time interval or during a first sampling window 23. After the end of this time interval, the evaluation and control circuit 25 can set the comparator switching threshold of the comparator 9 to the second switching threshold 12, in order to determine the duration 19 for which the resulting output signal of the comparator, i.e. the second comparison signal 14, has the first value 16 in a second time interval or during a second sampling window 23. As explained above, the signal amplitude can be determined from the difference between the durations 18, 19.

LIST OF REFERENCE NUMBERS 1 measuring device
2 ultrasonic transducer
3 ultrasonic transducer
4 evaluation device
5 measuring tube
6 arrow
7 arrow
8 measurement signal
9 comparator
10 comparator
11 switching threshold
12 switching threshold
13 comparison signal
14 comparison signal
15 value
16 value
17 time difference
18 duration
19 duration
20 difference
21 edge 22 amplitude
23 sampling window
24 rectangular function
25 control and evaluation circuit
26 logic gate
27 logic gate
28 output signal
29 output signal
30 counter input signal
31 counter input signal
32 time counter
33 time counter
34 timing
35 time difference
36 signal amplitude
37 logic gate
38 D flip-flop
39 D flip-flop
4 result signal

The invention claimed is:

1. A measuring device, comprising:
at least one ultrasonic transducer; and
an evaluator for evaluating a measurement signal provided by said at least one ultrasonic transducer, said evaluator is set up to determine a first comparison signal, by comparing the measurement signal with a first switching threshold, and a second comparison signal, by comparing the measurement signal with a second switching threshold which is different from the first switching threshold, and to determine a signal amplitude of the measurement signal depending on the first and second comparison signal.

2. The measuring device according to claim 1, wherein the first comparison signal and/or the second comparison signal are square wave signals which assume a first value if the measurement signal falls below a respective switching threshold and a second value if the measurement signal exceeds the respective switching threshold.

3. The measuring device according to claim 2, wherein said evaluator is set up to determine the signal amplitude depending on a time difference between a duration for which the first comparison signal assumes the first or second value and a duration for which the second comparison signal takes the first or second value.

4. The measuring device according to claim 3, wherein said evaluator is set up to determine:
the duration for which the first comparison signal assumes the first or second value; and/or
the duration for which the second comparison signal assumes the first or second value; and/or
the time difference for a sampling window which contains a plurality of oscillation periods of the measurement signal.

5. The measuring device according to claim 3, wherein:
said evaluator includes at least one logic gate and at least one time counter which is increased with a preset timing precisely when an input of said at least one time counter is supplied with a counter input signal having a predetermined value; and
said at least one counter is supplied with the first and/or second comparison signal and/or a result signal, which is determined depending on the first and second comparison signal, or an output signal of said at least one logic gate, which is supplied with the first and/or second comparison signal and/or the result signal as one of logic gate input signals, as the counter input signal, wherein the respective duration or the time difference are specified by a counter value of said at least one time counter.

6. The measuring device according to claim 5, wherein said at least one logic gate is fed with a square wave signal as a further logic gate input signal, the square wave signal changes its value at a beginning and at an end of a sampling window, for which the signal amplitude and/or the duration for which the first comparison signal assumes the first or second value and/or the duration for which the second comparison signal assumes the first or second value is to be determined.

7. The measuring device according to claim 5, wherein:
said evaluator is set up to determine the result signal as a difference signal between the first and second comparison signals; and/or
said evaluator contains at least one further logic gate, wherein said evaluator is set up in such a way that the first and second comparison signals are supplied to said at least one further logic gate as input signals and that an output signal of said at least one further logic gate is used as the result signal.

8. The measuring device according to claim 7, wherein said at least one further logic gate is an exclusive OR gate.

9. The measuring device according to claim 3, wherein said evaluator is set up to determine the signal amplitude by dividing a predetermined scaling factor by the time difference.

10. The measuring device according to claim 1, wherein said evaluator has a respective D flip-flop with a clock input fed with a square wave signal which changes its value at a beginning and at an end of a sampling window, for which the signal amplitude and/or a duration for which the first comparison signal assumes the first or second value and/or a duration for which the second comparison signal assumes the first or second value is to be determined, and to a data input of which the first or second comparison signal or the result signal which is determined from the first and second comparison signal is in each case supplied, wherein said evaluator is set up to break off a determination of the signal amplitude and/or the respective duration for the sampling window or to discard the signal amplitude determined and/or the respective determined duration if the output of said D flip-flop has a predetermined value.

11. The measuring device according to claim 1, wherein the first and second switching thresholds have signs which are different from one another.

12. The measuring device according to claim 11, wherein said evaluator is set up to determine the first comparison signal during a first time interval by comparing the measurement signal with the first switching threshold and to determine the second comparison signal after an end of the first time interval during a second time interval by comparing the measurement signal with the second switching threshold.

13. The measuring device according to claim 12, wherein:
said evaluator has a comparator; and
said evaluator has a control and evaluation circuit which is set up to set a comparator switching threshold of said comparator to the first switching threshold in the first time interval and to the second switching threshold in the second time interval.

14. The measuring device according to claim 1, wherein said evaluator has:
a first comparator receiving the first switching threshold, said first comparator is set up to convert the measurement signal into the first comparison signal; and/or a second comparator receiving the second switching threshold, said second comparator is set up to convert the measurement signal into the second comparison signal.

15. The measuring device according to claim 1, wherein the measuring device is set up to repeatedly determine the signal amplitude and, in a case of at least one repetition, to specify the first and/or the second switching threshold depending on the signal amplitude determined previously.

16. The measuring device according to claim 1,
further comprising a measuring tube and through said measuring tube a fluid can flow;
wherein said at least one ultrasonic transducer is one of least two ultrasonic transducers which are disposed spaced apart from one another at said measuring tube; and
wherein said evaluator is set up to control in each case one of said ultrasonic transducers for exciting an ultrasonic wave in the fluid, and to determine a transit time of the ultrasonic wave between said ultrasonic transducers using the measurement data of the other said ultrasonic transducer, and to determine a flow rate and/or a flow volume of the fluid through said measuring tube depending on the transit time.

17. The measuring device according to claim 1, wherein the measuring device is a flow meter.

18. The measuring device according to claim 1, wherein the first and second switching thresholds have signs which are different from one another and have an equivalent value.

\* \* \* \* \*